US012657408B2

(12) United States Patent
McGrath

(10) Patent No.: US 12,657,408 B2
(45) Date of Patent: Jun. 16, 2026

(54) CARD READER FOREIGN OBJECT DETECTION

(71) Applicant: NCR Atleos Corporation, Atlanta, GA (US)

(72) Inventor: Shannon Louise McGrath, Perth (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 19/016,840

(22) Filed: Jan. 10, 2025

(65) Prior Publication Data

US 2025/0148225 A1 May 8, 2025

Related U.S. Application Data

(63) Continuation of application No. 18/194,107, filed on Mar. 31, 2023, now Pat. No. 12,254,373.

(51) Int. Cl.
*G06K 7/00* (2006.01)
*G06K 7/08* (2006.01)

(52) U.S. Cl.
CPC .......... *G06K 7/0069* (2013.01); *G06K 7/087* (2013.01)

(58) Field of Classification Search
CPC .. G06K 7/0069; G06K 7/087; G06K 13/0868; G06K 7/0091
See application file for complete search history.

(56) References Cited

U.S. PATENT DOCUMENTS

| | | | |
|---|---|---|---|
| 2004/0035929 A1* | 2/2004 | Okada .................... | G06K 13/08 235/438 |
| 2007/0108278 A1* | 5/2007 | Masterton .............. | G06K 13/08 235/439 |
| 2009/0159687 A1* | 6/2009 | Clark .................... | G07F 7/0873 235/475 |
| 2016/0070939 A1* | 3/2016 | Bytheway .......... | G01R 27/2605 235/438 |
| 2022/0207249 A1* | 6/2022 | Miyazawa .............. | G06K 13/08 |
| 2022/0391604 A1* | 12/2022 | Kageyama .............. | G06K 7/08 |

* cited by examiner

*Primary Examiner* — Sonji N Johnson
(74) *Attorney, Agent, or Firm* — Schwegman Lundberg & Woessner, P.A.

(57) ABSTRACT

A card reader includes a movable upper surface platform with a lower surface platform including one or more sensors. When there is no card transaction in progress, the upper surface platform moves toward the lower surface platform and locks in place making contact with the lower surface platform. The one or more sensor indicate whether the two surfaces are in contact with one another. When the two surfaces are not in contact with one another, when the card reader is in an idle state, the card reader shuts down/disables since there is foreign object is present in the card reader's transport path, which may indicate a skimmer/shimmer was placed in the card reader.

17 Claims, 5 Drawing Sheets

100

160

100A

300

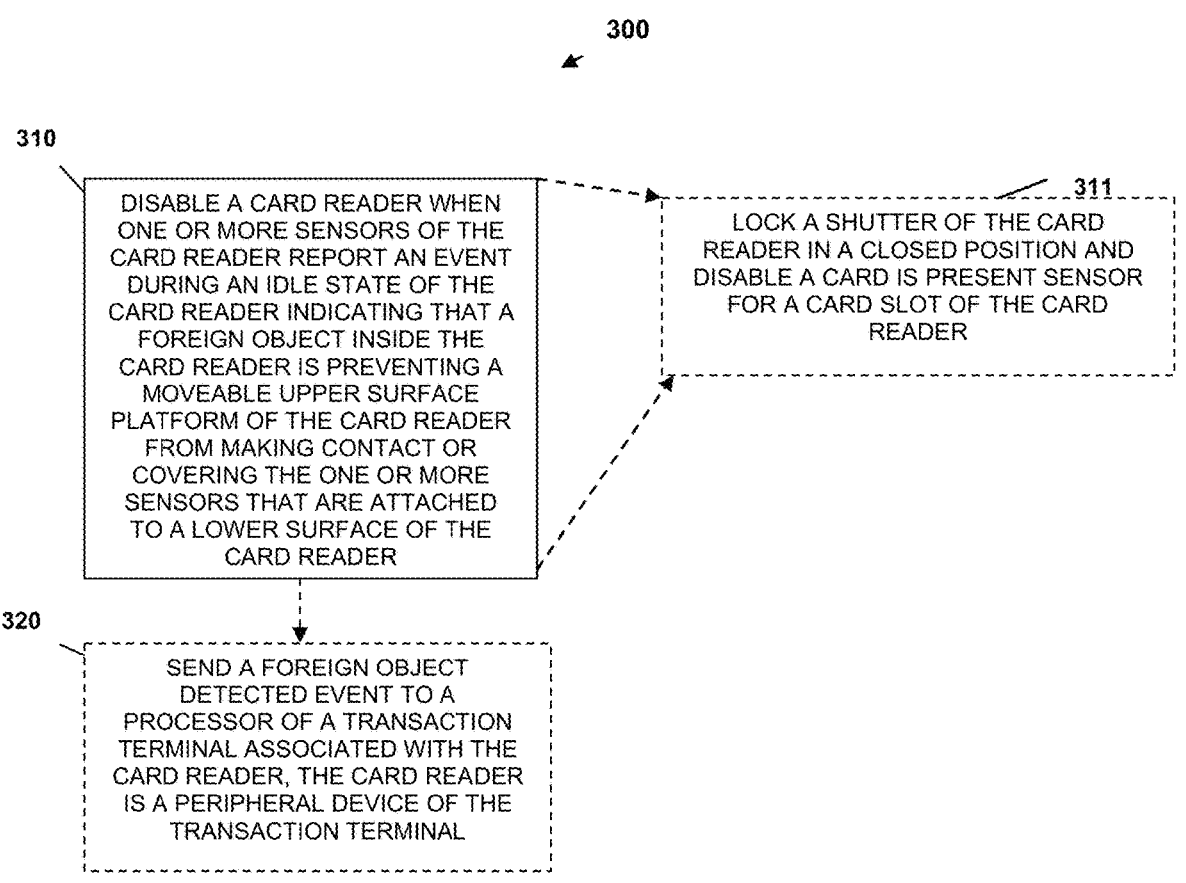

310

DISABLE A CARD READER WHEN ONE OR MORE SENSORS OF THE CARD READER REPORT AN EVENT DURING AN IDLE STATE OF THE CARD READER INDICATING THAT A FOREIGN OBJECT INSIDE THE CARD READER IS PREVENTING A MOVEABLE UPPER SURFACE PLATFORM OF THE CARD READER FROM MAKING CONTACT OR COVERING THE ONE OR MORE SENSORS THAT ARE ATTACHED TO A LOWER SURFACE OF THE CARD READER

311

LOCK A SHUTTER OF THE CARD READER IN A CLOSED POSITION AND DISABLE A CARD IS PRESENT SENSOR FOR A CARD SLOT OF THE CARD READER

320

SEND A FOREIGN OBJECT DETECTED EVENT TO A PROCESSOR OF A TRANSACTION TERMINAL ASSOCIATED WITH THE CARD READER, THE CARD READER IS A PERIPHERAL DEVICE OF THE TRANSACTION TERMINAL

FIG. 3

CARD READER FOREIGN OBJECT DETECTION

CROSS-REFERENCE TO RELATED APPLICATION

This application is a continuation of U.S. patent application Ser. No. 18/194,107, filed Mar. 31, 2023, which application and publication is incorporated herein by reference in its entirety.

BACKGROUND

Skimmers and shimming devices are getting thinner and thinner as manufacturing by criminals improve. Recent skimmers and shimming devices has proven to defeat current security measures in motorized card readers, such as by narrowing the card transport areas of the card readers. The transport areas can only be narrowed so much in order to still allow a card transaction to take place without card jams. There have been cases in the field of successful skimmers of less than millimeter (mm) thick fitting into tamper-resistant card readers.

Again, there is only a limited amount that the card transportation area can be narrowed for a card transaction to take place without a high number of card jams. This presents a technical problem in the industry. which to date has been unable to be solved by the industry.

SUMMARY

In various embodiments, a card reader, a method of operating a card reader, and a system for a card reader are presented for detecting foreign objects in the card reader. A card reader is provided with a spring-loaded or motorized upper surface. A lower transport surface that opposes the upper surface includes at least one sensor. The more sensors on this surface, the more sensitive and efficient the new security feather will be. When there is no card transaction in progress the card reader is reported as closed, the upper surface moves down and makes contact with the lower transport surface. If any object is on the lower surface so as to prevent the upper surface from making contact with the lower surface, the sensor reports this condition and the card reader is disabled, as there is a foreign object located within the card reader, which potentially could be a skimmer or a shimming device.

BRIEF DESCRIPTION OF THE DRAWINGS

FIG. 3 is a diagram of a method for disabling a card reader when a foreign object is detected within the card reader, according to an example embodiment.

DETAILED DESCRIPTION

As stated above, skimmers and shimming devices are a big problem in the industry. A variety of card manufactures have attempted to narrow the card transport area to no avail since some criminals now employ devices as small as less than 1 mm thick, which is almost equal to the half the thickness of bank and credit cards. These card manufacturing techniques have not been working well in the industry and skimmers/shimmers remain a significant problem in the industry.

The teachings that follow provide a new card reader that utilizes one or more sensors situated on a lower surface of the transport area and a movable upper surface situated above the lower surface. The shutter of the card reader is closed when the card reader is in an idle state. A shutter sensor reports when the shutter closes or opens. When the shutter is closed, the movable upper surface moves down towards the lower surface to make contact with the lower surface. The one or more sensors on the lower surface report if the upper surface made contact with the lower surface of did not make contact with the lower surface. The card reader is disabled when the one or more sensors are reporting that the upper surface is not in contact with the lower surface. This is an indication that a skimmer/shimmer is potentially present within the transport area of the card reader. The card reader detects the foreign objects regardless of the width of the foreign objects, such that even a fraction of a mm in thickness skimmer/shimmer is detected and the card reader is disabled.

Figure 1A:
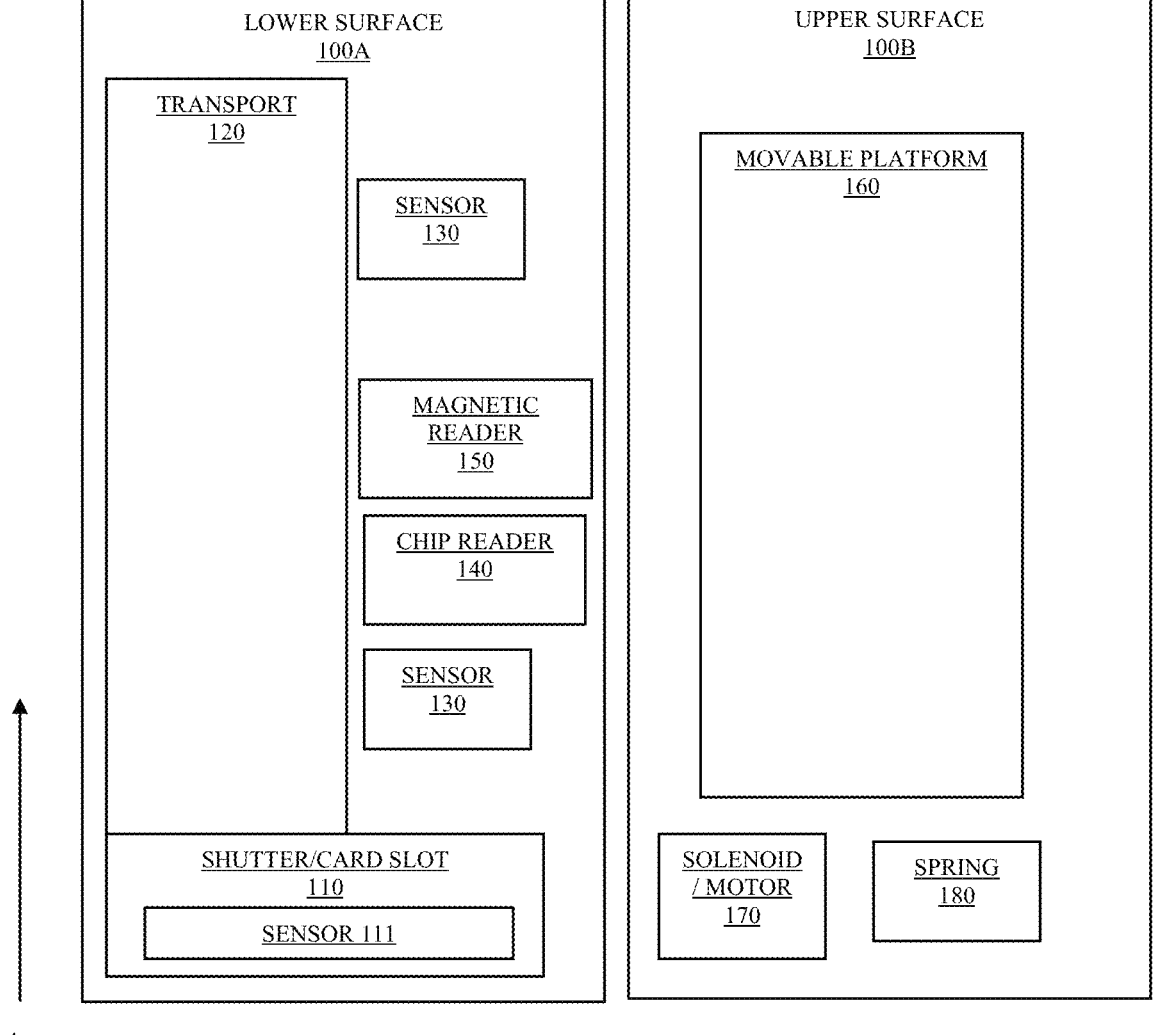
FIG. 1A is a diagram of card reader that detects a foreign object in the card reader, according to an example embodiment.
Figure 1B:
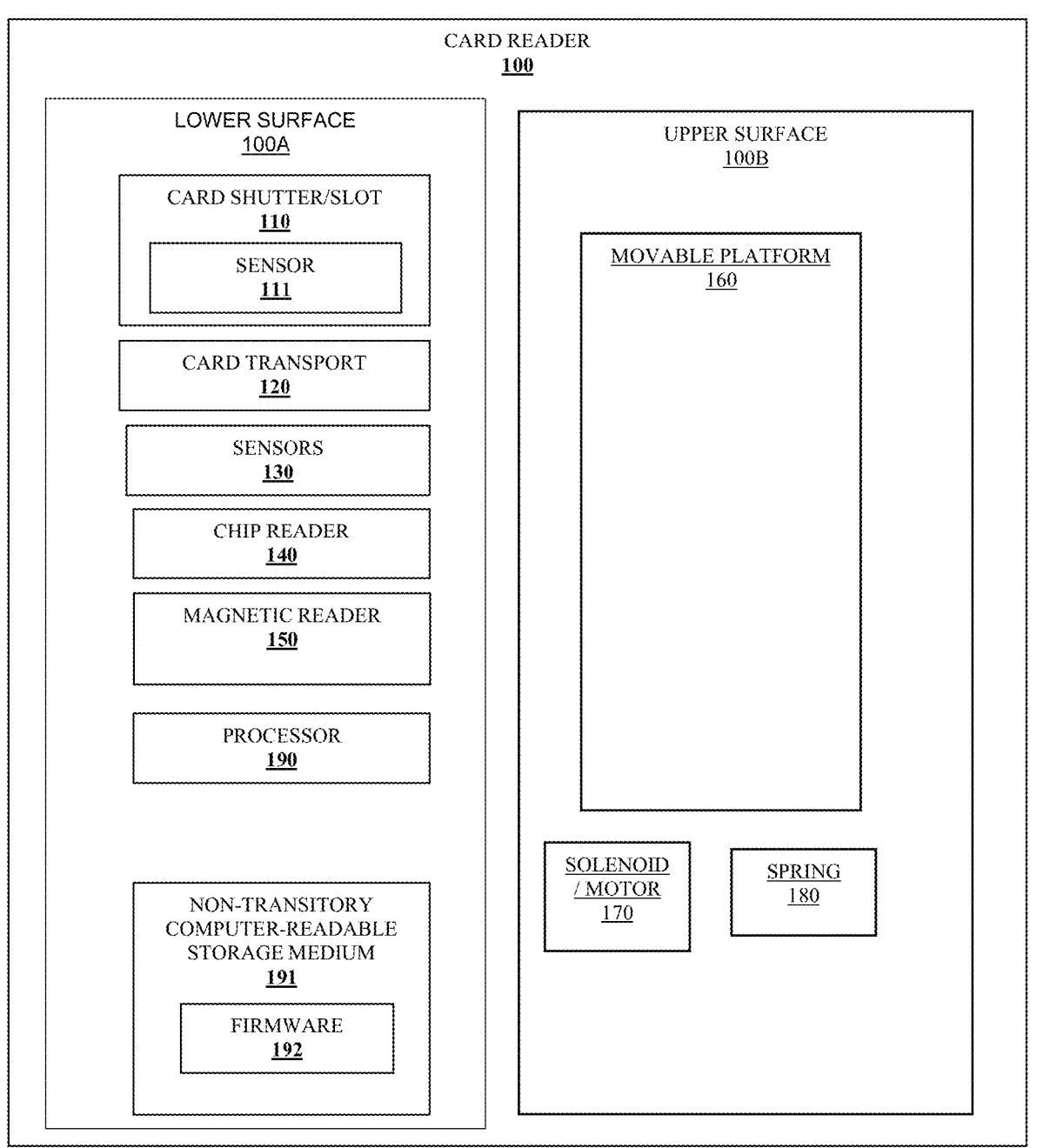
FIG. 1B is another diagram of the card reader of FIG. 1A, according to an example embodiment.

FIG. 1A is a diagram of card reader 100 that includes a lower surface 100A and an upper surface 100B. The lower surface 100A includes a card shutter/slot 110 with sensor 111, a card transport 120, one or more sensors 130, a chip reader or read head 140, and a magnetic reader or read head 150. The upper surface 100B includes a movable surface platform 160, optionally a solenoid/motor 170, and optionally a spring 180. FIG. 1B illustrates additional components of card reader 100 and discussed below with FIG. 1B.

Furthermore, the various components identified in the FIG. 1A) are illustrated and the arrangement of the components is presented for purposes of illustration only. It is to be noted that other arrangements with more or fewer components are possible without departing from the teachings of disabling a card reader 100 when a foreign object is detected along the card transport 120 of the lower surface 100A as presented herein and below.

Shutter/card slot 110 is activated at a transaction terminal during a transaction when a card is expected for the transaction or upon detection by sensor 111 that a card is being presented for entry into card reader 100. Sensor 111 reports when shutter 110 is opened or closed and/or reports when a card is being presented to the card slot 110 in cases where card reader 100 lacks a shutter.

When the shutter or card slot opens based on the event reported by sensor 111, transport 120 activates to urge the card along the transport path or transport 120 for purposes of reading the card through a magnetic reader 150 when the card lacks a chip or for purposes of reading the card through chip reader 130 when the card includes an embedded chip. Reader 150 or 140 reads card data from the card and provides the card data back to the transaction terminal. With the card data obtained, transport 120 moves the card back out through card slow 110 and the card returns to the consumer who is performing a transaction on the transaction terminal.

As stated above, a shimmer/skimmer may be present along the transport 120 or lower surface 100A, such that when the card is read, the card data is intercepted and saved in memory/storage of the shimmer/skimmer and/or transmitted wirelessly to a nearby device of a thief. However, unlike convention detection mechanisms before the shutter or card slot 110 was activated for the consumer transaction and before the card was urged along the transport 120 (in the direction indicated by the arrow and label "A" within FIG. 1A), card reader 100 already determined that there was not a shimmer/skimmer device or any other foreign object along the transport path 120.

This is achieved via sensor 130 or sensors 130 located adjacent to the transport path and via moveable platform 160. When the card reader 100 is idle and not being used for a card transaction, moveable platform 160 lowers onto and is in contact with lower surface 100A. Movable platform 160 locks into place until sensor 111 reports that shutter 110 is opened for a card transaction or sensor 111 reports that a card is being presented for a card transaction to card slot 110. When sensor 111 reports such an event or condition, movable platform 160 raises off of lower surface and returns to a card reading position to receive the card within the card reader 100.

Sensor 130 or sensors 130 report when the card reader 100 is in an idle state an event indicating whether movable 160 is in contact with lower surface 100A or not. When sensor 130 or sensors 130 report an event indication that moveable platform 160 is not in contact with lower surface 100A during an idle state for card reader 100, card reader 100 is disabled for card transactions because a foreign object is wedged in between lower surface 100A and moveable platform 160. The foreign object could potentially be a skimmer/shimmer device placed into the card reader 100 by a thief/criminal. In fact, any foreign object along lower surface 100A is an indication that something is amiss and card reader 100 should be disabled for card transactions.

In an embodiment, moveable platform 160 is spring loaded behind a back surface of moveable platform 160. The force of a card being inserted into card slot 110 forces the spring 180 of the upper surface 100B to contact and allow entry into the card reader 100. When a card is removed from the card reader 100, the spring releases and pushes moveable platform 160 onto lower surface 100A.

In an embodiment, moveable platform 160 is spring loaded with a spring, a latch, and a spring contraction apparatus. The latch and spring contraction apparatus controlled by a solenoid or a small motor 170 to contract the spring 180, attached to a back surface of moveable platform 160, into a card entry state for purposes of permitting a card inserted into card slot 110 during a transaction. The latch is released when the an idle state is reported by sensor 111 indicating no card is expected in card reader 100; this causes the spring to uncoil and push mobile platform 160 onto lower surface 100A.

In an embodiment, a rail mechanism with a solenoid or small motor raises and lowers movable platform 160 off of and on to lower surface 100A. At least one side, any combination of more than one side, or all of the sides for moveable platform 160 aligned in the rail mechanism.

In an embodiment, sensor 130 is a single sensor 130 attached onto the lower surface in an area not previously occupied by other components of the lower surface 100A for an existing card reader being enhanced as card reader 100. In an embodiment, sensor 130 is two or more sensors 130 are attached in areas not previous occupied by other components of lower surface 100A for an existing card reader being enhanced as card reader 100.

In an embodiment, sensor 130 or sensors 130 is/are a microswitch sensor, a time-of-flight sensor, or an optical sensor. The optical sensor embodiment reports light detected between lower surface 100A and upper surface 100B such that when moveable platform 160 lowers onto lower surface 100A the optical sensor is covered and reports no presence of light. When the card reader 100 is expected to be in an idle state and a sensor 130 reports an event indicating that mobile platform 160 is in contact with lower surface 100A, card reader 100 disables the card reader for card transactions and reports a potential foreign object detected event to the transaction terminal. In response, the transaction terminal initiates additional security operations and procedures.

FIG. 1B is another diagram of the card reader 100 of FIG. 1A, according to an example embodiment. FIG. 1B illustrates that card reader 100 further includes a processor 190 and a non-transitory computer-readable storage medium (hereinafter "medium") 191 for executable instructions or firmware 192. The instructions/firmware 192 when executed by processor 190 from medium 191 cause processor 190 to perform operations discussed herein and below.

For example, the processor 190 monitors events reported from sensors 111 and 130. When sensor 111 reports that the card reader 100 is in an idle state, processor 190 expects an all-clear event from sensor 130 or sensors 130 indicating that moveable platform 160 is in contact with lower surface 100A. When an all-clear event is not received from sensor 130 or sensors 130, processor 190 disables card reader 100 and sends a foreign object event to the transaction terminal associated with card reader 100. The card reader 100 can be disabled by locking shutter 110, disabling power to card reader 100, and/or permanently setting the state of the card reader 100 to offline or idle and not permitting the state to be changed. It is noted that processor 190 can perform other operations to effectively disable card reader 100, such as disabling magnetic reader 150 and chip reader 140.

In an embodiment, processor 190 activates a motor or solenoid 170 to cause movable platform 160 to lower onto or raise off of lower surface 100A. In an embodiment, processor 190, delays checking for an all-clear event by a configurable amount of micro seconds to permit mobile platform 160 to properly be lowered onto lower surface 100A following a completion of a card transaction on card reader 100.

Figure 1C:
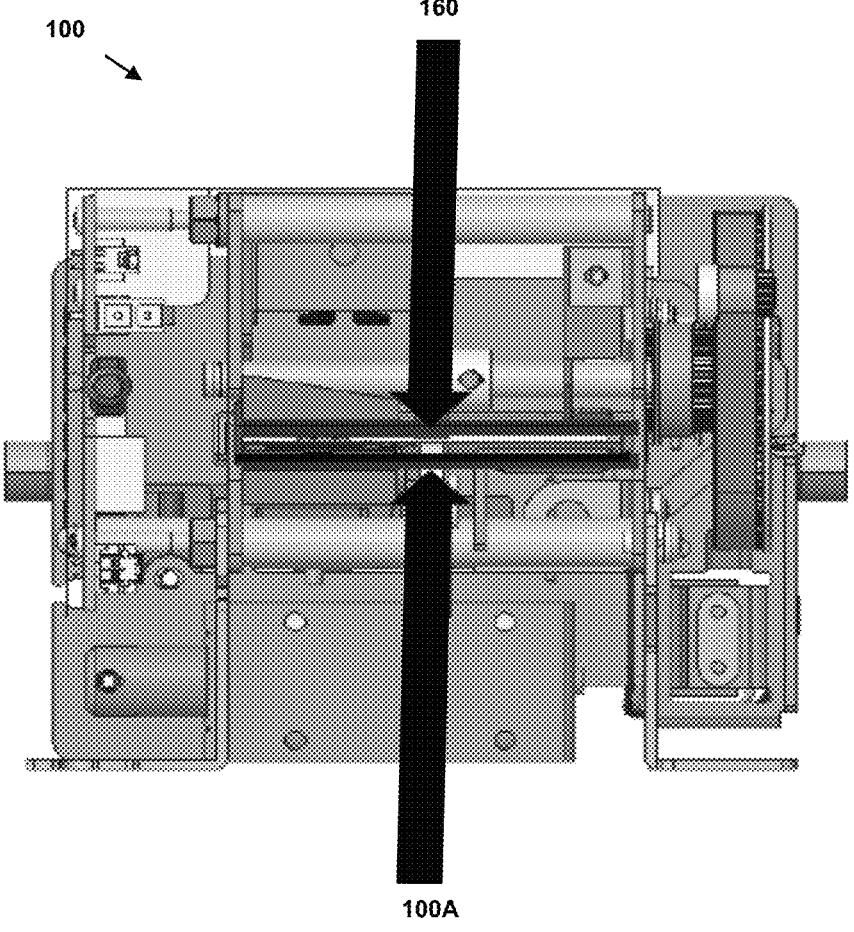
FIG. 1C is a schematic diagram of rear-view of the card reader of FIGS. 1A and 1B where the upper surface of the card reader is moving down towards the lower surface after the card shutter is closed, according to an example embodiment.

FIG. 1C is a schematic diagram of rear-view of the card reader 100 of FIGS. 1A and 1B where the mobile platform 160 of the card reader 100 is moving down towards the lower surface 100A after the card shutter 110 is closed, according to an example embodiment. FIG. 1C illustrates that mobile platform 160 is in contact with lower surface 100A is moving from a card transaction position following a completed card transaction down to contact the lower surface 100A at which point sensor 130 or sensors 130 report an all-clear event to processor 190.

Figure 2:
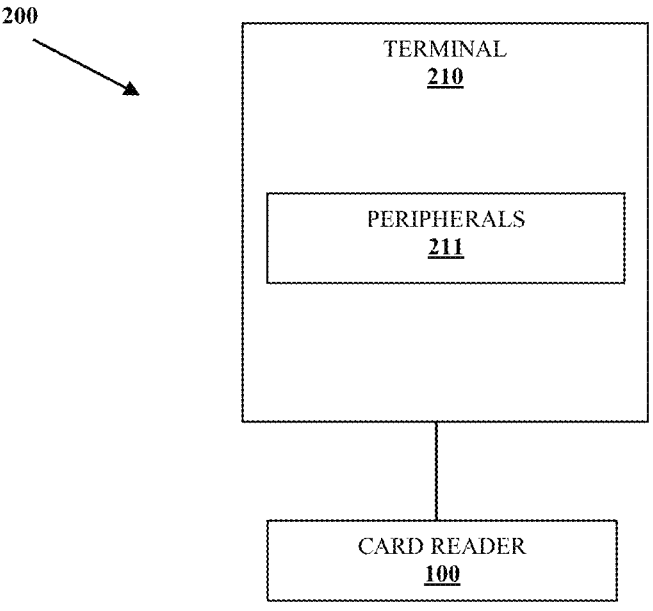
FIG. 2 is a diagram of a system for a card reader that detects foreign objects in the card reader, according to an example embodiment.

FIG. 2 is a diagram 200 of a system for card reader 100 that detects foreign objects in the card reader, according to an example embodiment. The system includes a transaction terminal 210, other terminal peripheral devices 211 of terminal 210, and card reader 100 as a card reader peripheral device of terminal 210.

In an embodiment, the other peripherals 211 include a touch display, a receipt printer, a media depository, a media dispenser, a scanner, a weigh scale, a combined scanner and weigh scale, a bag scale, a keypad, a Personal Identification Number (PIN) pad, an encrypted PIN pad, etc. In an embodiment, the terminal 210 is an ATM, a self-service terminal (SST), a point-of-sale (POS) terminal, a fuel pump kiosk, a travel kiosk, a reservation kiosk, an entertainment kiosk, or an informational kiosk.

During operation of the terminal 210, a customer inserts a card (for example, a credit card, a debit card, a bank card, a loyalty card, a gift card, etc.) into card slot 111 of card reader 100. In an embodiment, firmware 192 executed by processor 190 cause processor to perform operations discussed above with FIGS. 1B and 1C. For example, processor 190 detects a card is present event for a card transaction at terminal 210 via card reader 100, sensor 111 reports the card is present event to processor 190. In an embodiment, a spring-loaded moveable platform 160 is forced upward and away from contact with lower surface 100A by the force of a card being inserted into card reader 100, which contracts/ coils a spring 180 of card reader 100. In an embodiment, processor 190 activates a solenoid/motor 170 of card reader 100 to urge movable platform 160 off of and out of contact with lower surface 100A based on the card is present event.

In an embodiment, processor 190 detects a shutter opened event reported by sensor 111. A spring-loaded moveable platform 160 is forced upward and away from contact with lower surface 100A by the force of a card being inserted into card reader 100, which contracts/coils a spring 180 of card reader 100. In an embodiment, processor 190 activates a solenoid/motor 170 of card reader 100 to urge movable platform 160 off of and out of contact with lower surface 100A based on the card is present event.

In an embodiment, when the card is withdrawn from the card reader 100, a spring-loaded moveable platform 160 de-coils or expands by the force of gravity and/or preconfigured tension of the spring 180. The spring 180 in a relaxed state without the card wedged between lower surface 100A and mobile platform 160 expands forcing mobile platform 160 onto and into contact with lower surface 100A. Movable platform 160 covers or touches sensor 130 and/or sensors 130 and report an expected event for an idle state of card reader 100 to processor 190. When the expected event is not received from sensor 130 or sensors 130, processor 190 initiates operations to disable the card reader 100 and report a foreign object detected event to a processor of terminal 210.

In an embodiment, when the card is withdrawn from the card reader 100, processor 190 activates a solenoid/motor 170 to urge/move mobile platform 160 down from an initial position, which was associated with the card is present event, and onto lower surface 100A touching or covering sensor 130 or sensors 130. Sensor 130 or sensors 130 remote an expected event for an idle state of card reader 100 to processor 190. When the expected event is not received from sensor 130 or sensors 130, processor 190 initiates operations to disable the card reader 100 and report a foreign object detected event to a processor of terminal 210.

Any presence of a foreign object including a skimmer/ shimmer device of a single mm or less, is detected by card reader 100 when the card reader 100 is supposed to be in an idle state. This causes the card reader 100 to be disabled and a foreign object detected event sent to a processor of terminal 210. Moreover, card jams associated with narrowing the card transport area are avoided because the card transport area is adjusted to have a sufficient clearance for any card inserted into card reader 100 whenever the card reader 100 is reporting a card is present or shutter is opened event. Thus, card reader 100 is flexible in design to catch and to detect any skimmer/shimmer manufactured by criminals.

FIG. 3 is a diagram of a method 300 for disabling a card reader 100 when a foreign object is detected within the card reader 100, according to an example embodiment. The method 300 is implemented as executable instructions referred to herein as "firmware." The firmware is executed by a processor 190 of a card reader 100, which cause the processor 190 to perform operations discussed with method 300. The firmware resides in non-transitory computer-readable storage media 191 or memory of the card reader 100. In an embodiment, the firmware is firmware 192 discussed above with FIGS. 1B, 1C, and 2.

At 310, the firmware disables a card reader 100 when one or more sensors 130 of the card reader 100 report an event during an idle state of the card reader 100. The event is an indication that a foreign object is inside the card reader's card transport area prevent a moveable upper surface platform 100B from making contact or covering the one or more sensors 130, which are attached to a lower surface 100A of the card reader 100.

In an embodiment, at 311, the firmware locks a shutter 110 of the card reader 100 in a closed position and disables a card is present sensor 111 for a card slot 110 of the card reader 100. In embodiment, the card reader is disable in any of the above-discussed manners.

In an embodiment, at 320, the firmware sends a foreign object detected event to a processor of a transaction terminal 210. The terminal 210 is associated with card reader 100 and the card reader is a peripheral device of the terminal 210. In an embodiment, security software or security systems executed by the processor of the terminal 210 or executed by a cloud processor of a cloud connect to terminal 210 can disable the terminal 210 in response to receiving the foreign object detected event and cause service personnel/staff to be dispatched to visually inspect the card transport area of card reader 100 for the presence of a skimmer/shimmer device.

It should be appreciated that where software/firmware is described in a particular form (such as a component or module) this is merely to aid understanding and is not intended to limit how software/firmware that implements those functions may be architected or structured. For example, modules are illustrated as separate modules, but may be implemented as homogenous code, as individual components, some, but not all of these modules may be combined, or the functions may be implemented in software/ firmware structured in any other convenient manner.

Furthermore, although the software/firmware modules are illustrated as executing on one piece of hardware, the software/firmware may be distributed over multiple processors or in any other convenient manner. The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

monitoring, by a processor of a card reader, events reported from a shutter sensor and a foreign object sensor of the card reader, wherein the shutter sensor is situated proximate to a card slot of the card reader and the foreign object sensor is situated on a lower surface of the card reader;

receiving, by the processor, a card reader idle state event from the shutter sensor;

determining, by the processor, whether the foreign object sensor reports an all-clear event indicating a moveable platform of the card reader is in contact with the lower surface, wherein determining further includes delaying checking for the all-clear event by a configurable amount of time to permit the moveable platform to properly lower onto the lower surface;

disabling, by the processor, the card reader when the all-clear event is not received from the foreign object sensor; and sending, by the processor, a foreign object detected event to a transaction terminal associated with the card reader.

2. The method of claim 1, wherein disabling further includes locking the card slot of the card reader.

3. The method of claim 1, wherein disabling further includes disabling power to the card reader.

4. The method of claim 1, wherein disabling further includes setting a state of the card reader to offline.

5. The method of claim 1, wherein disabling further includes disabling a magnetic reader and a chip reader of the card reader.

6. The method of claim 1, wherein monitoring further includes activating a motor to cause the moveable platform to lower onto the lower surface.

7. The method of claim 1, wherein monitoring further includes activating a solenoid to cause the moveable platform to lower onto the lower surface.

8. The method of claim 1, wherein receiving further includes detecting completion of a card transaction before receiving the card reader idle state event.

9. The method of claim 1, wherein determining further includes receiving the all-clear event from multiple foreign object sensors distributed on the lower surface.

10. The method of claim 1, wherein sending further includes initiating additional security operations at the transaction terminal in response to the foreign object detected event.

11. A method, comprising:

receiving, by a processor of a card reader, a card present event from a sensor situated proximate to a card slot of the card reader;

activating, by the processor, a mechanism to move a moveable platform away from a lower surface of the card reader, wherein activating the mechanism further includes operating a rail mechanism with a motor to raise and lower the moveable platform;

processing, by the processor, a card transaction;

detecting, by the processor, withdrawal of a card from the card reader;

activating, by the processor, the mechanism to move the moveable platform onto the lower surface;

determining, by the processor, whether at least one sensor on the lower surface reports an expected event indicating the moveable platform is in contact with the lower surface; and disabling, by the processor, the card reader when the expected event is not received.

12. The method of claim 11, wherein activating the mechanism further includes releasing a spring-loaded latch causing a spring to uncoil and push the moveable platform onto the lower surface.

13. The method of claim 11, wherein determining further includes monitoring a microswitch sensor on the lower surface.

14. The method of claim 11, wherein determining further includes monitoring a time-of-flight sensor on the lower surface.

15. The method of claim 11, wherein determining further includes monitoring an optical sensor that reports light detected between the lower surface and the moveable platform.

16. The method of claim 11, wherein disabling further includes permanently setting a state of the card reader to idle.

17. A system, comprising:

a transaction terminal;

a card reader comprising:

a lower fixed surface having at least one sensor;

a moveable upper surface;

a processor;

a non-transitory computer-readable storage medium having executable instructions; and the executable instructions when executed by the processor from the non-transitory computer-readable storage medium cause the processor to:

monitor events from a card slot sensor and the at least one sensor;

move the moveable upper surface toward the lower fixed surface during an idle state;

determine whether the at least one sensor reports contact between the moveable upper surface and the lower fixed surface;

disable the card reader when no contact is reported; and cause the processor to activate a spring contraction apparatus controlled by a solenoid to contract a spring attached to the moveable upper surface into a card entry state during a transaction.

* * * * *